United States Patent
Noto et al.

(10) Patent No.: US 9,758,393 B2
(45) Date of Patent: Sep. 12, 2017

(54) FRESH WATER GENERATION SYSTEM

(71) Applicants: Hitachi, Ltd., Tokyo (JP); Toray Industries, Inc., Tokyo (JP)

(72) Inventors: Kazuhiko Noto, Tokyo (JP); Kotaro Kitamura, Tokyo (JP); Yusuke Okawa, Tokyo (JP); Hiroo Takabatake, Shiga (JP)

(73) Assignees: HITACHI, LTD., Tokyo (JP); TORAY INDUSTRIES, INC., Tokyo (JP)

( * ) Notice: Subject to any disclaimer, the term of this patent is extended or adjusted under 35 U.S.C. 154(b) by 483 days.

(21) Appl. No.: 14/351,988

(22) PCT Filed: Sep. 24, 2012

(86) PCT No.: PCT/JP2012/074436
§ 371 (c)(1),
(2) Date: Apr. 15, 2014

(87) PCT Pub. No.: WO2013/058063
PCT Pub. Date: Apr. 25, 2013

(65) Prior Publication Data
US 2014/0263013 A1    Sep. 18, 2014

(30) Foreign Application Priority Data
Oct. 19, 2011  (JP) ................. 2011-229818

(51) Int. Cl.
*B01D 33/70*    (2006.01)
*B01D 63/00*    (2006.01)
(Continued)

(52) U.S. Cl.
CPC .............. *C02F 1/50* (2013.01); *B01D 61/142* (2013.01); *C02F 9/00* (2013.01); *B01D 2311/04* (2013.01);
(Continued)

(58) Field of Classification Search
CPC .......... C02F 1/441; C02F 1/444; C02F 1/001; C02F 3/1268; C02F 2103/08;
(Continued)

(56) References Cited

U.S. PATENT DOCUMENTS 6,280,626 B1    8/2001  Miyashita et al.
6,468,430 B1 *  10/2002  Kimura ................. A61L 2/18
                                                 210/636
(Continued)

FOREIGN PATENT DOCUMENTS

JP    2004-130233    4/2004
JP    2010-149100    7/2010
(Continued)

OTHER PUBLICATIONS

Jun. 25, 2015 Extended European Search Report issued in European Patent Application No. 12842454.6.
(Continued)

*Primary Examiner* — Claire Norris
(74) *Attorney, Agent, or Firm* — Oliff PLC

(57) ABSTRACT

Provided is a fresh water generation system which filters biotreated water produced by microbiologically treating waste water via a primary semi-permeable membrane (8), and then mixes concentrated water rejected by the filtration with seawater, thereby to filter the mixed water via a secondary semi-permeable membrane (14). This system enables frequencies of chemical cleaning and replacement of the secondary semi-permeable membrane to be reduced. The fresh water generation system comprises: a primary semi-permeable membrane apparatus (9) which separates microorganism treating waste water into permeated water and concentrated water; a secondary semi-permeable membrane apparatus (13) which filters mixed water prepared by mixing the concentrated water into seawater. In the fresh water (Continued)

generation system, the primary semi-permeable membrane (8) has an equal to or a higher microorganism adhesive property than the secondary semi-permeable membrane (14).

14 Claims, 4 Drawing Sheets

(51) Int. Cl.
    *C02F 1/50*     (2006.01)
    *B01D 61/14*     (2006.01)
    *C02F 9/00*     (2006.01)
    *C02F 1/44*     (2006.01)
    *C02F 101/30*     (2006.01)
    *C02F 103/08*     (2006.01)
    *C02F 1/76*     (2006.01)
    *C02F 3/12*     (2006.01)

(52) U.S. Cl.
    CPC .......... *B01D 2319/022* (2013.01); *C02F 1/44* (2013.01); *C02F 1/441* (2013.01); *C02F 1/442* (2013.01); *C02F 1/444* (2013.01); *C02F 1/76* (2013.01); *C02F 1/766* (2013.01); *C02F 3/1268* (2013.01); *C02F 2101/30* (2013.01); *C02F 2103/08* (2013.01); *C02F 2303/185* (2013.01); *C02F 2303/20* (2013.01); *Y02W 10/15* (2015.05)

(58) Field of Classification Search
    CPC ..... C02F 3/1273; B01D 61/025; B01D 65/08; B01D 2311/06; B01D 2311/12; B01D 2311/2688; B01D 2321/16; B01D 61/145; B01D 61/04

USPC .......................................................... 210/151
See application file for complete search history.

(56) References Cited

U.S. PATENT DOCUMENTS

| | | | |
|---|---|---|---|
| 7,387,723 B2 * | 6/2008 | Jordan | B01D 61/14 210/220 |
| 2010/0193436 A1 * | 8/2010 | Ruehr | B01D 61/025 210/636 |
| 2011/0042306 A1 * | 2/2011 | Ito | B01D 61/022 210/601 |
| 2012/0024789 A1 * | 2/2012 | Sarkar | B01D 65/08 210/652 |
| 2012/0145630 A1 | 6/2012 | Ogiwara et al. | |
| 2012/0255907 A1 | 10/2012 | Ogiwara et al. | |

FOREIGN PATENT DOCUMENTS

| | | |
|---|---|---|
| TW | 423992 B | 3/2001 |
| WO | 2010/061879 A1 | 6/2010 |
| WO | WO 2011/021415 | 2/2011 |
| WO | WO 2011/077815 | 6/2011 |

OTHER PUBLICATIONS

Jan. 26, 2015 Office Action issued in Taiwanese Application No. 101138231.
JP Notice of Reasons for Rejection for JP Application No. 2013-539586, issued on Oct. 21, 2014.

* cited by examiner

FRESH WATER GENERATION SYSTEM

TECHNICAL FIELD

The present invention relates to a fresh water generation system.

BACKGROUND ART

Patent Literature 1 discloses that a fresh water generation system which performs the steps of: filtering microorganism treatment effluent produced from the waste water which contains organic substances and is to be microbiologically treated, via a primary semi-permeable membrane; mixing the resultant concentrated water into seawater; and filtering the mixed water via a secondary semi-permeable membrane. Those steps allow an osmotic pressure of seawater to be reduced, resulting in the power saving of pump supply needed for the filtration step of the secondary-semi permeable membrane.

According to such a fresh water generation system, when a pressure loss of a semi permeable membrane apparatus having primary and secondary semi-permeable membranes reaches a predetermined value, the respective semi-permeable membranes (or reverse osmotic membranes) are chemically cleaned so as to remove microorganisms treating waste water, the microorganisms adhering to the semi-permeable membranes. Herein, the pressure loss of the semi-permeable membrane apparatus represents a value calculated by subtracting a pressure of the concentrated water from a pressure of the injection water in the semi-permeable membrane apparatus.

In the meantime, even if a semi-permeable membrane is chemically cleaned, multiple times repeated chemical cleaning gradually increases a pressure loss of the semi-permeable membrane apparatus at the initial operation period just after each chemical cleaning. This requires replacement of a semi-permeable membrane. Thus, the replacement timing of a semi-permeable membrane is determined, for example, at the time when a pressure loss of the apparatus reaches about 3-fold compared to the initial pressure loss thereof.

Alternatively, a low biofouling semi-permeable membrane which prevents microorganisms of treating effluent from adhering to the membrane thereof has been developed recently. Herein, such a low biofouling semi-permeable membrane (for example, TORAY INDUSTRIES, INC.; TML 20 TYPE) is used for a primary semi-permeable membrane (or a semi-permeable membrane in an apparatus of treating waste water), which filters microorganism treating effluent in which microorganisms are easily cultivated; the microorganism treating effluent containing a lot of organic substances compared to seawater.

CITATION LIST

Patent Literature

[Patent Literature 1] Japanese Patent No. 4481345

SUMMARY OF INVENTION

Technical Problems to be Solved by the Invention

However, if such a low biofouling semi-permeable membrane is used for a primary semi-permeable membrane, the number of the microorganisms of treating effluent contained in the concentrated water increases. This may cause a drawback that a frequency of the operations for cleaning a secondary semi-permeable membrane (or a semi-permeable membrane in a seawater treatment apparatus) increases. Further, this also increases a frequency of replacing the secondary semi-permeable membrane.

For example, if such a low biofouling membrane was used as a primary semi-permeable membrane, the primary and secondary semi-permeable membranes were chemically cleaned every three months in the primary and secondary semi-permeable membrane apparatuses as shown by the arrows "A" in FIG. 3. Herein, each arrow "A" in FIG. 3 points out reduction in a pressure loss of the semi-permeability apparatus, caused by the chemical cleaning thereof.

Accordingly, so many times of the chemical cleaning results in the increased frequency of replacing the semi-permeable membrane, leading to a cost increase. Further, excess amounts of biocide are required to clean the primary and secondary semi-permeable membranes in order to suppress the frequent replacement of the semi-permeable membrane, leading to an inefficient system performance.

From the viewpoint of the drawbacks as mentioned above, the present invention is directed to the reduction in the frequency of the chemical cleaning and semi-permeable membrane replacement, thereby to provide a fresh water generation system having high efficiency from an economical viewpoint.

Means for Solving the Problems

In a first aspect of the present invention, a fresh water generation system is provided, comprising a primary semi-permeable membrane apparatus which separates waste water treated by microorganisms derived from microbiologically treated effluent which contains organic substances, into filtrate and concentrated water via a primary semi-permeable membrane; and a secondary semi-permeable membrane apparatus which mixes seawater with the resultant concentrated water rejected by the primary semi-permeable membrane apparatus. Then, the mixed water is filtered via a secondary semi-permeable membrane.

Herein, the primary and secondary semi-permeable membrane apparatuses respectively house at last one semi-permeable membrane element. The semi-permeable membrane element used in the primary semi-permeable membrane apparatus has an equal to or a higher microorganism adhesive property than the secondary semi-permeable membrane element.

In a second aspect of the present invention, the fresh water generation apparatus comprises the primary semi-permeable membrane apparatus which separates microorganism treating waste water derived from microbiologically treated effluent containing organic substances, into filtrate and concentrated water via the primary semi-permeable membrane; and the secondary semi-permeable membrane apparatus which mixes seawater with the resultant concentrated water rejected by the primary semi-permeable membrane apparatus, thereby to filter the mixed water via the secondary semi-permeable membrane.

Herein, the primary semi-permeable membrane has an equal to or a higher microorganism adhesive property than the secondary semi-permeable membrane.

In the first and second aspects of the present invention, it is preferable to intermittently inject biocide into the effluent treated by microorganisms, or to inject biocide into the mixed water composed of seawater and the concentrated water rejected by the primary semi-permeable membrane apparatus. Further, it is more preferable to increase a frequency of injecting the biocide into the mixed water, an injection amount thereof, or an injection concentration thereof, when the biocide is injected into the effluent treated by microorganisms together with the mixed water composed of seawater and the concentrated water rejected by the primary semi-permeable membrane apparatus.

Moreover, it is preferable that the biocide is at least one typed biocide selected from a group of free chlorine based biocide, based biocide, bromine based biocide, an acid, and an alkali.

If the biocide is injected, it is preferable not to mix at least a part of the concentrated water rejected by the primary semi-permeable membrane apparatus with seawater which is to be supplied into the secondary semi-permeable membrane apparatus. Further, it is preferable not to supply at least a part of the mixed water composed of seawater and the concentrated water to the secondary semi-permeable membrane.

In the first and second aspects of the present invention, it is preferable that at least either of the primary and secondary semi-permeable membranes is a semi-permeable membrane which contains a polyamide or cellulose triacetate as a component thereof. Also, it is preferable that the microorganism is a hydrophobic microorganism.

Furthermore, it is preferable that the primary semi-permeable membrane is a semi-permeable membrane which contains cellulose triacetate as a component thereof. Also, it is preferable that the hydrophobic microorganism is a *Mycobacterium* bacterium.

In the first and second aspects of the present invention, it is preferable that a value representing the adhesive property of the microorganisms is equal to a B/F rate which defines a rate of the number of the microorganisms (B) respectively adhering to the primary semi-permeable membrane, the secondary semi-permeable membrane, the primary semi-permeable membrane element or the secondary semi-permeable membrane element against the number of the pre-determined microorganisms (F). Herein, it is noted that the predetermined number of the microorganisms is brought into contact with the primary semi-permeable membrane, the secondary semi-permeable membrane, the primary semi-permeable membrane element or the secondary semi-permeable membrane element.

Further, it is also preferable that the B/F rate of the primary semi-permeable membrane element is 2-fold or more than the B/F rate of the secondary semi-permeable membrane element. Alternatively, it is preferable that the B/F rate of the primary semi-permeable membrane is 2-fold or more than the B/F rate of the secondary semi-permeable membrane.

Further, in the first and second aspects of the present invention, it is preferable to arrange a filter for trapping microorganisms; the filter separating the microorganisms included in the concentrated water rejected by the primary semi-permeable apparatus. Moreover, it is also preferable to arrange an ultrafilter which conducts ultrafiltration of mixed water comprised of seawater and the concentrated water rejected by the primary semi-permeable membrane apparatus, at the period after mixing seawater with the concentrated water rejected by the primary semi-permeable membrane apparatus, and before filtering the mixed water via the secondary semi-permeable membrane.

Advantageous Effects of the Invention

According to the present invention, the frequency of conducting the chemical cleaning of the semi-permeable membranes included in the whole system and the frequency of replacing the semi-permeable membranes may be reduced. This advantageous effect allows the system to have more economical efficiency.

EMBODIMENTS FOR CARRYING OUT THE INVENTION

Figure 1:
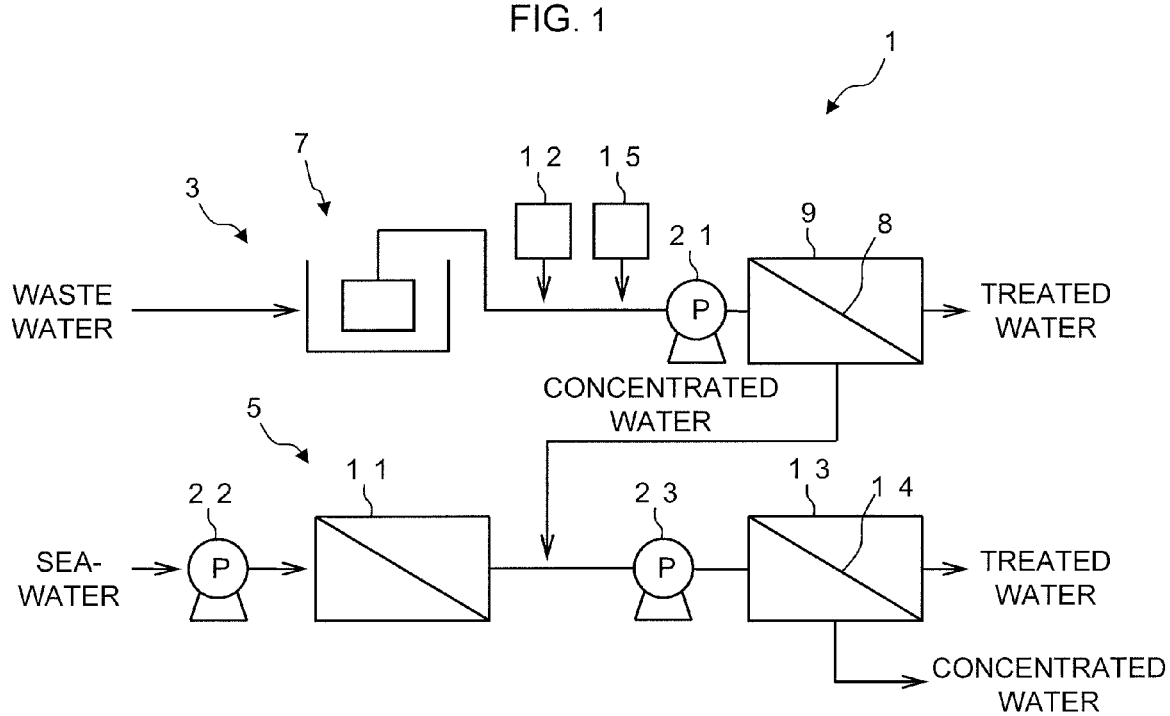
FIG. 1 is a block diagram showing a schematic construction of a fresh water generation system in an embodiment of the present invention.

Hereinafter, embodiments for carrying out the present invention will be explained in detail in reference to attached drawings. As shown in FIG. 1, a fresh water generation system 1 in an embodiment comprises a waste water treatment unit 3 and a seawater treatment unit 5. The waste water treatment unit 3 treats waste water as raw water, derived from effluent which includes organic substances. The waste water treatment unit 3 comprises a membrane bioreactor (MBR) tank 7 and a primary semi-permeable membrane apparatus 9 having a primary semi-permeable membrane 8. Herein, influent water is transferred to the primary semi-permeable membrane apparatus 9 by a pressure of a first pump 21.

Further, a biocide inlet 12 and a neutralizing agent inlet 15 are arranged between the membrane bioreactor tank 7 and the primary semi-permeable membrane apparatus 9. After biocide has been injected into the treated water of the membrane bioreactor tank 7 via the biocide inlet 12, a neutralizing agent is injected via the neutralizing agent inlet 15, thereby to reduce the biocide. Here, the biocide is hypochlorous acid and the neutralizing agent is sodium bisulfite. Accordingly, hypochlorous acid is reduced by sodium bisulfite so as to remove available chlorine. Then, the resultant treated water is transferred to the primary semi-permeable membrane apparatus 9.

Note preferably the biocide is at least one typed biocide selected from a group of free chlorine based biocide such as hypochlorous acid, combined chlorine based biocide such as chloramines, bromine based biocide such as DBNPA (2,2-dibromo-3-nitrilopropion amide), an acid such as sulfuric acid, and an alkali such as NaOH.

Further, if at least one biocide selected from a group of combined chlorine based biocide, bromine based biocide, an acid and an alkali is used, the treated water to which the selected biocide has been injected may be directly supplied to the primary semi-permeable membrane apparatus 9. In such a case, the primary semi-permeable membrane 8 is not damaged, allowing the treated water to be supplied without injecting the neutralizing agent thereto.

The seawater treatment unit 5 comprises an ultrafiltration apparatus 11 having an ultrafiltration membrane (or UF membrane) and a secondary semi-permeable apparatus 13 having a secondary semi-permeable membrane 14. The seawater is transferred to the ultrafiltration apparatus 11 by a pressure of a pump 22. Herein, the treated water of the ultrafiltration apparatus 11 is transferred to the secondary semi-permeable apparatus 13 by a higher pressure of a pump 23 than the pressure of the first pump 21.

Hereinafter, operation and performance of the fresh water generation system in the present embodiment will be explained.

After the supplied raw water has been contacted with activated sludge in the membrane bioreactor tank 7, the resultant treated water is filtered by a membrane separation unit thereby to separate biotreated water from the activated sludge. Then, the resultant biotreated water is supplied to the primary semi-permeable membrane apparatus 9 located downstream. Herein, a shape of the membrane bioreactor tank 7 is not specifically limited, as long as the membrane bioreactor tank 7 has functions of: decomposing organic substances by the microorganism treatment; performing a solid-liquid separation using a membrane or the like; and hereby obtaining the biotreated water having few solid substances.

For example, the solid-liquid separation is performed by gravitational sedimentation after the raw water has been treated by microorganisms in the activated sludge, and then the resultant supernatant may be treated by an UF membrane or a microfiltration membrane (or MF membrane) or the like.

In the primary semi-permeable membrane apparatus 9, the supplied biotreated water is filtered via the primary semi-permeable membrane 8 to be separated into concentrated water and permeated water. Accordingly, the permeated water is obtained as treated water. Then, the concentrated water of the primary semi-permeable membrane apparatus 9 is mixed with the treated water of the ultrafiltration apparatus 11 located in the seawater treatment unit 5.

On the other hand, seawater is filtered as raw water via a UF membrane of the ultrafiltration apparatus 11 located in the seawater treatment unit 5. Herein, an MF membrane may be used instead of the UF membrane. Further, the ultrafiltration apparatus 11 may be replaced with a sand filter. After the filtrate has been mixed with the above-mentioned concentrated water of the primary semi-permeable membrane apparatus 9, the mixed water is supplied to the secondary semi-permeable membrane apparatus 13.

Herein, it is preferable to inject at least one typed biocide into the mixed water, the biocide being selected from a group of free chlorine based biocide, combined chlorine based biocide, bromine based biocide such as DBNPA, an acid and an alkali, similarly to the primary semi-permeable membrane.

Further, in the case that the biocide is selected from a group of combined chlorine based biocide, bromine based biocide, an acid and an alkali, the mixed water to which the biocide has been injected causes no damage to the secondary semi-permeable membrane 14 even when the mixed water is to be supplied as it is to the secondary semi-permeable membrane apparatus 13. Therefore, it is more preferable to inject no neutralizing agent into the mixed water and supply the resultant mixed water to the secondary semi-permeable membrane apparatus 13.

The secondary semi-permeable membrane apparatus 13 treats the supplied mixed water via the secondary semi-permeable membrane 14 to separate the mixed water into concentrated water and permeated water. Accordingly, treated water is obtained from the permeated water.

Herein, the treated water filtered in the membrane bioreactor tank 7 is intermittently injected with the biocide to sterilize the water.

Note when the biocide is injected via the biocide inlet 12, it is preferable to mix no concentrated water of the primary semi-permeable membrane apparatus 9 into the seawater treatment unit 5. The reason is that when the biocide is injected, it is assumed that a lot of microorganism dead bodies are included in the concentrated water of the primary semi-permeable membrane apparatus 9. Therefore, it is not preferable to supply such contaminated water to the seawater treatment unit 5.

In the present embodiment, a semi-permeable membrane to which microorganisms more easily (or equally) adhere is used for the primary semi-permeable membrane 8 compared to the secondary semi-permeable membrane 14. This construction facilitates the microorganisms included in the concentrated water of the primary semi-permeable membrane apparatus 9 to be more easily trapped by the primary semi-permeable membrane 8. This results in the decrease in the number of the microorganisms included in the concentrated water.

Therefore, the number of microorganisms included in the mixed water which is to be supplied to the secondary semi-permeable membrane apparatus 13 is decreased. This enables the adhesion of the microorganisms to the secondary semi-permeable membrane 14 to be decreased, resulting in the decrease in the frequency of conducting the chemical cleaning of the secondary semi-permeable membrane 14, and the frequency of replacing the membrane 14.

The primary semi-permeable membrane 8 and the secondary semi-permeable membrane 14 may be any of semi-permeable membranes as long as each semi-permeable membrane has a desalination function like a reverse osmosis membrane (or RO membrane), a nanofiltration membrane (or NF membrane), and a loose reverse osmosis membrane. Such a semi-permeable membrane may include variety types of membranes such as a hallow fiber membrane, a spiral membrane and a tubular membrane, or a composite membrane composed of an activated layer, a support layer and a substrate.

Further, a polymer comprising a polyamide such as an aromatic polyamide or cellulose triacetate as a component of the polymer, or a polymer composed of those components may be used for the primary semi-permeable membrane 8 and the secondary semi-permeable membrane 14.

Here, the semi-permeable membrane made of cellulose triacetate as a main component thereof is particularly great biocide having a high bactericidal effect. Further, when such a semi-permeable membrane is used in combination with a semi-permeable membrane made of a polyamide as a main component thereof, "free chlorine based biocide", which may cause damages to the semi-permeable membrane, may be used without problems. These features allow the above-mentioned biocide to be used for directly sterilizing microorganisms adhering to the semi-permeable membrane.

Accordingly, if a membrane which contains cellulose triacetate as a main component thereof (or membrane composed of cellulose triacetate) is applied to the primary semi-permeable membrane 8 that is dare to be designed such that hydrophobic microorganisms (or free microorganism) easily adhere to the membrane, it is possible to use free chlorine based biocide which sterilizes the microorganisms in a highly effective manner, the microorganisms adhering to the semi-permeable membrane. This construction enables the biofouling effect to be highly increased.

Further, the primary semi-permeable membrane 8 and the secondary semi-permeable membrane 14 may be composed of a single element, or a plurality of elements. Herein, the element includes a semi-permeable membrane to which raw water is supplied from one side surface of the semi-permeable membrane, and permeated water is obtained from the other side surface of the semi-permeable membrane. The element is constructed such that the membrane area is increased by bundling a lot of separation membrane elements with various shapes. This construction enables a lot of permeated water per unit element to be obtained.

Figure 4:
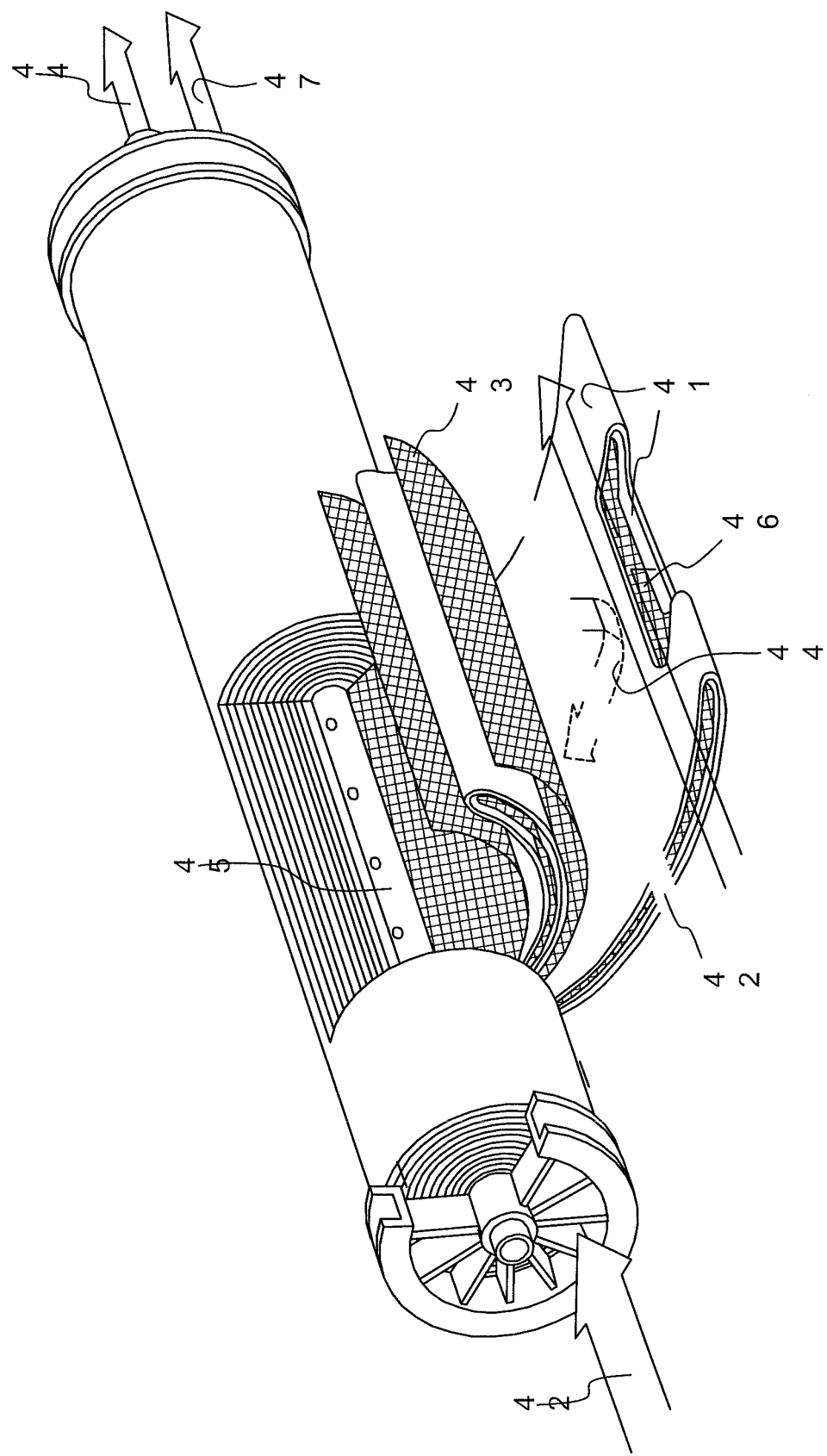
FIG. 4 is a diagram showing a structure of a representative example of a semi-permeable membrane element of a spiral wound type.

For example, as shown in FIG. 4, the spiral wound typed element has a structure in which both of a passage material at the supply side 43 for supplying the raw water 42 to the surface of the separation membrane 41 and a passage material at the permeated side 46 for introducing the permeated water permeated via the separation membrane are wounded around a central pipe 45 for collecting and transferring permeated water 44 via a separation membrane 41. Here, the raw water 42 is supplied to the spiral wound typed element, allowing the raw water 42 to be separated into the permeated water 44 and the concentrated water 47.

In the fresh water generation system in the above-mentioned embodiment, a low pressure semi-permeable membrane with 1.6 MPa (Toray Industries, Inc., TM720 TYPE: the B/F rate of the adhesive amount of hydrophobic microorganisms is 0.13) is used for the primary semi-permeable membrane 8. A high pressure semi-permeable membrane for desalting seawater with 5.5 MPa (Toray Industries, Inc., TM820 TYPE: the B/F rate of the adhesive amount of hydrophobic microorganisms is 0.13) is used for the secondary semi-permeable membrane 14.

Figure 2:
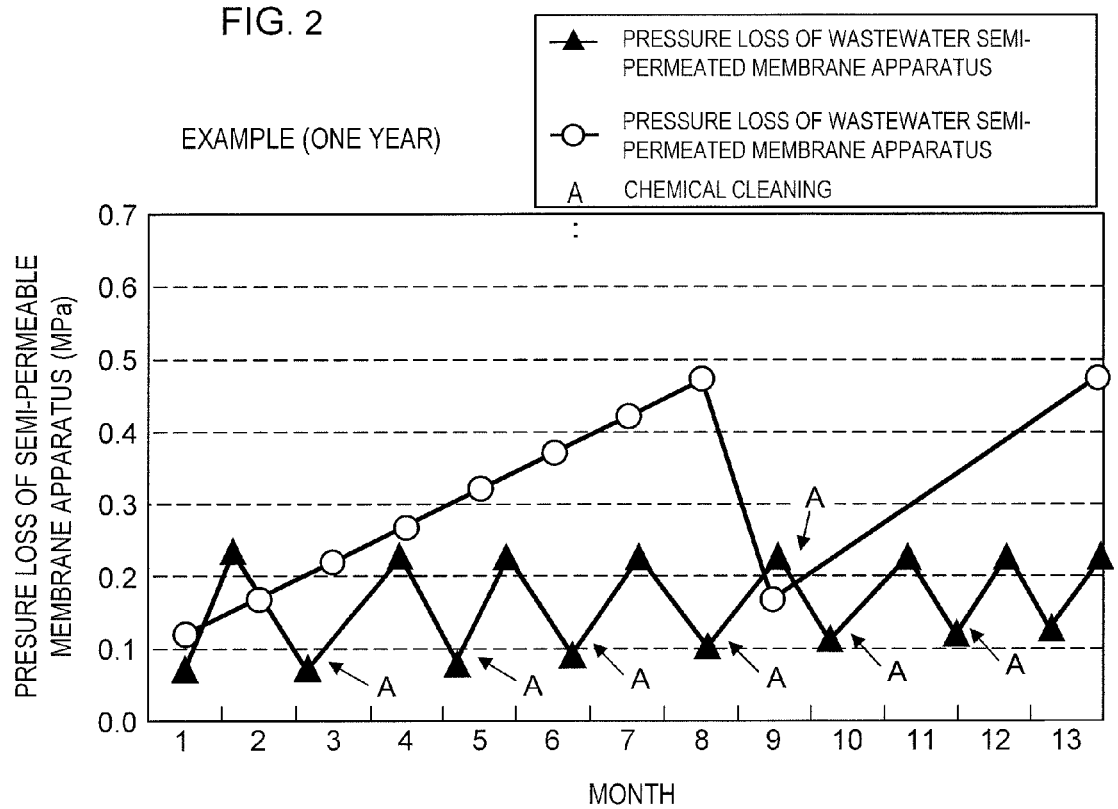
FIG. 2 is a graphic diagram showing chemical cleaning timing of each semi-permeable membrane in the freshwater generation system in an embodiment of the present invention.

Here, FIG. 2 is a graphic diagram showing fluctuations of pressure losses of the semi-permeable apparatuses when the fresh water generation system having the above-mentioned membranes was operated for one year.

In the present invention, the property how easily the microorganisms adhere to the semi-permeable membrane is represented by the B/F rate measured in the following procedure.

After *Mycobacterium* strain BT12-100 of a hydrophobic microorganism was pre-incubated in the R2A medium, the strain was incubated in the sterilized MS medium that contained a radioisotope of $Na_2^{35}SO_4$ for 72 hrs using a rotary shaker (at 200 rpm and 28° C.) The MS medium comprised mannitol (1.0 g), $Na_2HPO_4$ (0.75 g), $K_2HPO_4$ (0.75 g), $NH_4Cl$ (1.0 g), $MgSO_4 7H_2O$ (0.01 g), $CaCl_2 2H_2O$ (0.01 g), $FeSO_4 7H_2O$ (1 mg), $ZnSO_4 7H_2O$ (1 mg), $MnSO_4 4H_2O$ (1 mg) per distilled water (1 L). Then, a centrifugal separation process and a washing process in which a sterilized MS buffer solution prepared by removing mannitol from the components of the above-mentioned MS medium was used, were repeated twice.

After the processes were repeated, microorganisms were collected and the collected microorganisms were re-suspended in the sterilized MS buffer solution. At that time, the concentration of the microorganisms in the range of $5 \times 10^{9-10}$ [cell/mL] was checked in a direct counting method via fluorescent microscope observation after the DAPI staining. If the concentration was out of the range, the concentration thereof was adjusted by again conducting the centrifugal separation process and adding the sterilized MS buffer solution. Then, the disintegration per minute (DPM) of the radioisotope [DPM/mL] in the adjusted microorganism suspension (here, the concentration of the microorganisms at that time was defined as C0 [cell/mL]) was analyzed by a liquid scintillation counter (LSC) (here, the DPM at that time was defined as DPM0 [DPM/mL]).

Next, a B/F rate of the semi-permeable membrane was determined by the following method. First, a bottom part of a sterilized plastic tube with a screw cap was cut off. At the cross-sectional surface of the cut tube, a semi-permeable membrane to be an evaluation target was attached such that a membrane functional layer was placed directed to inside the tube, and then the membrane was fixed thereon. At that time, the membrane area inside the plastic tube was defined as "A" [$cm^2$].

Then, the inside of the plastic tube and the semi-permeable membrane were washed 10 times or more by sterilized pure water or RO permeated water. At that time, no leak of the washing water from the fixed place of the membrane was checked. Then, into the plastic tube, was added predetermined volume of a sterilized MS buffer solution. Then, was further added the microorganism suspension prepared as mentioned above (v [mL]) such that the concentration of the microorganisms was adjusted in the range from $1 \times 10^8$ to $5 \times 10^8$ [cell/mL]. Here, the liquid volume in the plastic tube was defined as V1 [mL] (herein, setting v/A=2.4 to 2.5).

Next, the resultant plastic tube was sealed by the screw cap, and the microorganisms were incubated for 5 hrs in the rotary shaker (at 200 rpm and 28° C.). After the incubation, the liquid inside the plastic tube was disposed. The membrane was rinsed with the sterilized MS buffer solution (5.0 mL) twice and taken out. The taken out membrane was immersed in a DPM specific measurement solution and the DPM was analyzed by the LSC similarly to the previous case (herein, the DPM at that time was defined as DPM2 [DPM/mL]).

Next, based on the following equation, a B/F rate was calculated (where "B" represented the number of the microorganisms adhering to the membrane among the free microorganisms having the number of "F").

$$B/F = (DPM2 \times V2)/(DPM0 \times v)$$

Further, a B/F rate of the element was determined by the following method. First, raw water to be evaluated was prepared by adding the above-mentioned microorganism suspension to an MS buffer solution such that the concentration of the microorganisms was adjusted in the range from $1 \times 10^8$ to $5 \times 10^8$ [cell/mL]. Then, the DPM was analyzed by the LSC similarly to the previous cases (herein, the DPM at that time was defined as DPM0 [DPM/mL]).

The raw water to be evaluated was made to flow at a constant linear speed in the range from 0.4 to 0.5 m/s (for 5 hrs at 25 to 28° C.), only at the primary side of the semi-permeable membrane element. In other words, it was set that the raw water flowed without permeating the membrane, while it only contacted with the membrane. After the procedure, the DPM in the raw water was analyzed by the LSC similarly to the previous cases (herein, the DPM at that time was defined as DPM3 [DPM/mL]).

Then, based on the following equation, a B/F rate was calculated.

$$B/F = (DPM0 - DPM3)/(DPM0)$$

FIG. 2 is a graphic diagram in which the horizontal axis represents passed months and the vertical axis represents a pressure loss of the semi-permeable membrane. That diagram shows frequencies of the chemical cleaning for the primary semi-permeable membrane 8 and the secondary semi-permeable membrane 14.

As shown in FIG. 2, when the pressure loss of the semi-permeable membrane reached a predetermined value as pointed out by arrows "A", in each of the primary semi-permeable membrane apparatus 9 and the secondary semi-permeable membrane apparatus 13, the respective semi-permeable membranes were chemically cleaned. Herein, each arrow A indicates the lowering in the pressure loss of the semi-permeable membrane apparatus after conducting the chemical cleaning process.

Figure 3:
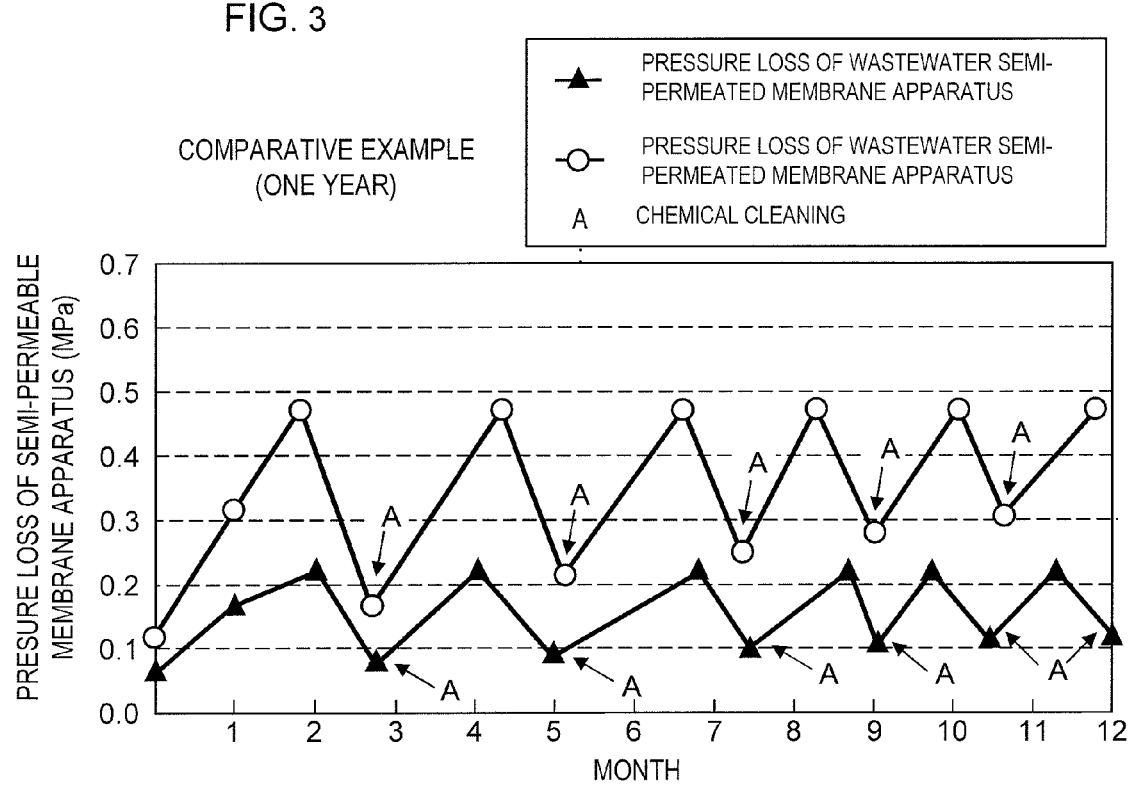
FIG. 3 is a graphic diagram showing chemical cleaning timing of each semi-permeable membrane in the freshwater generation system of COMPARATIVE EXAMPLE.

As it is apparent compared to the data in COMPARISON EXAMPLE of FIG. 3, conventionally the secondary semi-permeable membrane apparatus 13 required the chemical cleaning 5 times per about every 3 months or less. In contrast, the apparatus 13 only required the chemical cleaning totally 2 times per about every 6 months or more in the present embodiment. That is, according to the present embodiment, it was possible to reduce the frequency of the chemical cleaning for the secondary semi-permeable membrane 14 equal to or less than the half times in the conventional case. This also allowed the frequency of replacing the secondary semi-permeable membrane 14 to be reduced.

On the other hand, the primary semi-permeable membrane apparatus 9 required the chemical cleaning every 2 months. This resulted in the increase in the frequency of the chemical cleaning, requiring 6 times per one year, which was more frequent than the conventional case requiring 6 times per one year. However, the frequency of the chemical cleaning in the whole fresh water generation system 1 was 7 times (see FIG. 2). This resulted in a marked reduction of the frequency compared to the frequency of 11 times chemical cleaning in COMPARATIVE EXAMPLE (see FIG. 3).

In the present embodiment, the primary semi-permeable membrane 8 and the secondary semi-permeable membrane 14 were objectively and easily selected by comparing the microorganism adhesive properties based on the B/F rates among the selection candidates.

It should be noted that a semi-permeable membrane with the B/F rate of 0.01 or less may be regarded as a low biofouling membrane (for example, TORAY INDUSTRIES, INC; TML20 TYPE), and distinguished from a general semi-permeable membrane. In this regard, the data of above-mentioned embodiment clearly indicated that when a general biofouling membrane with the B/F rate more than 0.01 was used for the primary semi-permeable membrane 8, it was demonstrated that the frequencies of the chemical cleaning of the secondary semi-permeable membrane 14, and the replacement of the membrane 14 were able to be reduced when compared to the data of COMPARATIVE EXAMPLE shown in FIG. 3. Herein, note a low biofouling membrane with the B/F rate of 0.01 or less was used for the primary semi-permeable membrane 8 in COMPARATIVE EXAMPLE.

According to the present embodiment, it is possible to increase the biofouling effect of the secondary semi-permeable membrane 14 by injecting the biocide into the mixed water composed of seawater and the concentrated water separated from the primary semi-permeable membrane apparatus 9.

According to the present embodiment, when the biocide is injected into the biotreated water, at least a part of the concentrated water separated from the primary semi-permeable membrane apparatus 9 is not mixed with the seawater to be supplied to the secondary semi-permeable membrane apparatus 13, or at least a part of the mixed water composed of the concentrated water and the seawater is not supplied to the secondary semi-permeable membrane apparatus 13.

This procedure may prevent the concentrated water to which the biocide has been injected thereby to contain a lot of microorganism dead bodies, from being supplied to the secondary semi-permeable membrane apparatus 13. Accordingly, it is possible to suppress the increase in the pressure loss of the secondary semi-permeable membrane apparatus 13 having the secondary semi-permeable membrane 14, the pressure loss being caused by the microorganism dead bodies. Therefore, it is possible to further reduce the frequencies of the chemical cleaning of the secondary semi-permeable membrane 14 and the replacement of the membrane 14.

According to the present embodiment, a microorganism trap filter may be arranged, which removes the microorganisms in the concentrated water of the primary semi-permeable membrane apparatus 9 from the above-mentioned concentrated water. This construction may prevent the concentrated water which contains a lot of microorganisms from being supplied to the secondary semi-permeable membrane apparatus 13. Further, in the present embodiment, at the period after the concentrated water of the primary semi-permeable membrane apparatus 9 has been mixed with seawater and before the resultant mixed water is to be filtered via the secondary semi-permeable membrane 14, the mixed water composed of the concentrated water and the seawater may be treated by the ultrafiltration. This procedure may prevent the concentrated water which contains a lot of microorganisms from being supplied to the secondary semi-permeable membrane apparatus 13.

Thus, the above-mentioned construction may suppress the increase in the pressure loss of the secondary semi-permeable membrane apparatus 13 having the secondary semi-permeable membrane 14, the increase in the pressure loss being caused by a lot of microorganisms. Accordingly, it is possible to further reduce the frequencies of the chemical cleaning for the secondary semi-permeable membrane 14 and the replacement of the membrane 14.

Note that a shape of the microorganism trap filter is not specifically limited as long as the microorganism trap filter is able to trap microorganisms.

The present invention is not limited to the above-mentioned embodiment, and various modifications are possible without departing from the scope of the present invention. For example, in the above-mentioned embodiment, a semi-permeable membrane with the same microorganism adhesive property as the secondary semi-permeable membrane 14 is used for the primary semi-permeable membrane 8. However, besides the above-mentioned membrane, a semi-permeable membrane having the more enhanced microorganism adhesive property than the secondary semi-permeable membrane 14 may be used for the primary semi-permeable membrane 8. For example, it is possible to use the primary semi-permeable membrane 8 having the B/F rate of 0.15, and the secondary semi-permeable membrane 14 having the B/F rate of 0.13. Further, it is possible to use the primary semi-permeable membrane 8 having the B/F rate of 0.13, and the secondary semi-permeable membrane 14 having the B/F rate of 0.01.

As described hereinbefore, if the B/F rates of the primary and secondary semi-permeable membrane 8 and 14 were equal, the frequency of the chemical cleaning of the secondary semi-permeable membrane 14 was able to be set twice per one year.

In contrast, if the B/F rate of the primary semi-permeable membrane 8 is 2-fold or more than the secondary semi-permeable membrane 14, it is possible to reduce the frequencies of the chemical cleaning of the secondary semi-permeable membrane 14 and the replacement of the membrane 14 at most once a year. Thus, for example, it is possible to conduct the maintenance of the secondary semi-permeable membrane 14 by the routine chemical cleaning and routine replacement every one year, leading to the more excellent maintenance performance.

Moreover, the waste water treatment unit 3 may first treat raw water at a settling basin before the raw water is supplied to the membrane bioreactor tank 7. Furthermore, the waste water treatment unit 3 is not limited to only use the membrane bioreactor tank 7. That is, after the waste water has been treated by the activated sludge, the waste water treatment unit 3 may settle the activated sludge. Alternatively, the waste water treatment unit 3 may conduct sand filtration for separation, thereby to obtain the biotreated water.

The seawater treatment unit 5 may use a microfiltration (or MF) apparatus or sand filtration instead of the ultrafiltration apparatus 11.

LIST OF REFERENCE SIGNS

1 Fresh Water Generation System
3 Waste Water Treatment Unit
5 Seawater Treatment Unit
8 Primary Semi-Permeable Membrane
9 Primary Semi-Permeable Membrane Apparatus
13 Secondary Semi-Permeable Apparatus
14 Secondary Semi-Permeable Membrane
41 Semi-Permeable Membrane (or Separation Membrane)
42 Raw Water
43 Passage Material at Supply Side
44 Permeated Water
45 Central Pipe
46 Passage Material at Permeated Side
47 Concentrated Water

The invention claimed is:

1. A fresh water generation system comprising:
a primary semi-permeable membrane apparatus which separates biotreated water produced by microbiologically treating waste water which contains organic substances into permeated water and concentrated water via a primary semi-permeable membrane, the primary semi-permeable membrane apparatus housing at least one primary semi-permeable membrane element; and
a secondary semi-permeable membrane apparatus which mixes seawater with the concentrated water obtained from the primary semi-permeable membrane apparatus producing a mixed water, and filters the mixed water via a secondary semi-permeable membrane, the secondary semi-permeable membrane apparatus housing at least one secondary semi-permeable membrane element,
wherein:
each of the primary semi-permeable membrane element and the secondary semi-permeable membrane element has a microorganism adhesive property represented by a B/F value, where B is a number of microorganisms adhering to the semi-permeable membrane element and F is a predetermined total number of the microorganisms brought into contact with the semi-permeable membrane element, and
the B/F value of the primary semi-permeable membrane element is higher than the B/F value of the secondary semi-permeable membrane element.

2. The fresh water generation system according to claim 1, wherein a biocide is intermittently injected into the biotreated water.

3. The fresh water generation system according to claim 1, wherein a biocide is injected into the mixed water.

4. The fresh water generation system according to claim 2, wherein the biocide includes at least one biocide selected from the group consisting of free chlorine based biocide, combined chlorine based biocide, bromine based biocide, an acid, and an alkali.

5. The fresh water generation system according to claim 1, wherein:
a biocide is injected into the biotreated water and into the mixed water; and
a frequency of injecting the biocide, an amount of the biocide, or a concentration of the biocide injected into the mixed water is greater than those of the biocide injected into the biotreated water.

6. The fresh water generation system according to claim 2, wherein:
at least a part of the concentrated water obtained from the primary semi-permeable membrane apparatus is not mixed with the seawater which is to be supplied to the secondary semi-permeable membrane apparatus; or
at least a part of the mixed water is not supplied to the secondary semi-permeable membrane.

7. The fresh water generation system according to claim 1, wherein:
at least either of the primary and secondary semi-permeable membranes comprises a polyamide or cellulose triacetate; and
a microorganism that adheres to the primary and secondary semi-permeable membrane elements is a hydrophobic microorganism.

8. The fresh water generation system according to claim 7, wherein the primary semi-permeable membranes comprises cellulose triacetate.

9. The fresh water generation system according to claim 7, wherein the hydrophobic microorganism is a *Mycobacterium bacillus*.

10. The fresh water generation system according to claim 1, wherein the B/F value of the primary semi-permeable membrane element is 2-fold or more than the B/F value of the secondary semi-permeable membrane element.

11. The fresh water generation system according to claim 1, further comprising a microorganism trap filter which removes microorganisms from the concentrated water obtained from the primary semi-permeable membrane apparatus.

12. The fresh water generation system according to claim 1, further comprising an ultrafilter which conducts ultrafiltration of the mixed water before the mixed water is to be filtered via the secondary semi-permeable membrane.

13. A fresh water generation system comprising:
a primary semi-permeable membrane apparatus which separates biotreated water produced by microbiologically treating waste water which contains organic substances into permeated water and concentrated water via a primary semi-permeable membrane; and
a secondary semi-permeable membrane apparatus which mixes seawater with the concentrated water obtained from the primary semi-permeable membrane apparatus producing a mixed water, and filters the mixed water via a secondary semi-permeable membrane,
wherein each of the primary semi-permeable membrane and the secondary semi-permeable membrane has a microorganism adhesive property represented by a B/F value, where B is a number of microorganisms adhering to the semi-permeable membrane and F is a predetermined total number of the microorganisms brought into contact with the semi-permeable membrane, and the B/F value of the primary semi-permeable membrane is higher than the B/F value of the secondary semi-permeable membrane.

14. The fresh water generation system according to claim 13, wherein the B/F value of the primary semi-permeable membrane is 2-fold or more than the B/F value of the secondary semi-permeable membrane.

* * * * *